(12) United States Patent
Hosoya et al.

(10) Patent No.: US 8,592,502 B2
(45) Date of Patent: Nov. 26, 2013

(54) INK COMPOSITION FOR INKJET PRINTING

(75) Inventors: Tetsuo Hosoya, Ibaraki-ken (JP);
Hiroshi Hayashi, Ibaraki-ken (JP);
Marie Morinaga, Ibaraki-ken (JP);
Naoyuki Torita, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 13/505,596

(22) PCT Filed: Oct. 22, 2010

(86) PCT No.: PCT/JP2010/068678
§ 371 (c)(1),
(2), (4) Date: May 2, 2012

(87) PCT Pub. No.: WO2011/062028
PCT Pub. Date: May 26, 2011

(65) Prior Publication Data
US 2012/0220702 A1  Aug. 30, 2012

(30) Foreign Application Priority Data

Nov. 18, 2009  (JP) ............... P2009-262702
Aug. 16, 2010  (JP) ............... P2010-181796

(51) Int. Cl.
| | | |
|---|---|---|
| C09D 11/00 | (2006.01) |
| C08L 33/06 | (2006.01) |
| B60C 1/00 | (2006.01) |
| A01H 5/00 | (2006.01) |
| C08G 18/77 | (2006.01) |

(52) U.S. Cl.
USPC ........... 523/160; 524/560; 524/495; 524/414; 524/428; 524/115

(58) Field of Classification Search
USPC ........... 523/160; 524/560, 495, 414, 428, 115
See application file for complete search history.

(56) References Cited

U.S. PATENT DOCUMENTS

| | | | |
|---|---|---|---|
| 5,872,171 A * | 2/1999 | Detrano ................. 524/492 |
| 6,117,606 A * | 9/2000 | Macholdt et al. ........ 430/108.23 |
| 7,029,818 B2 * | 4/2006 | Rohr et al. ............. 430/137.15 |
| 2002/0098435 A1 | 7/2002 | Rohr et al. |
| 2009/0092801 A1 | 4/2009 | Sato et al. |
| 2010/0136236 A1 * | 6/2010 | Hosoya et al. ........... 427/261 |
| 2011/0046298 A1 | 2/2011 | Hosoya et al. |

FOREIGN PATENT DOCUMENTS

| | | |
|---|---|---|
| CN | 1214473 A | 4/1999 |
| JP | 2002-201374 A | 7/2002 |
| JP | 2005-171032 A | 6/2005 |
| JP | 2007-197500 A | 8/2007 |
| JP | 2008-231212 A | 10/2008 |
| TW | 200808918 A | 2/2008 |
| WO | 2007/125917 A1 | 11/2007 |

* cited by examiner

*Primary Examiner* — Alexander Kollias
(74) *Attorney, Agent, or Firm* — Nath, Goldberg & Meyer; Jerald L. Meyer; Sanjana Mangalagiri

(57) ABSTRACT

A non-aqueous ink composition for inkjet printing is provided, which comprises 0.01 to 10 wt % of at least one ionic substance (A) selected from the group consisting of quarterly ammonium salts, quarterly phosphonium salts, a combination of a fatty acid and/or an alkyl phosphate with an amine compound, and synergists, 0.1 to 20 wt % of an $C_{12-25}$ alkyl (meth)acrylate copolymer (B) having 1 to 40 wt %, relative to a weight of the copolymer, of urethane moiety, 0.1 to 20 wt % of a pigment (C), and an organic solvent (D). The composition achieves excellent wiping durability and printed image density.

9 Claims, No Drawings

INK COMPOSITION FOR INKJET PRINTING

This is a National Phase Application filed under 35 U.S.C. 371 as a national stage of PCT/JP2010/068678, filed Oct. 22, 2010, and claiming the benefit from Japanese Application No. 2009-262702, filed Nov. 18, 2009, and Japanese Application No. 2010-181796, filed Aug. 16, 2010, the content of which is hereby incorporated by reference in its entirety.

FIELD OF THE INVENTION

The present invention relates to an ink composition for inkjet printing, specifically to a non-aqueous ink composition comprising a copolymer having urethane bonds and an ionic substance. The non-aqueous ink composition hardly sticks to a nozzle plate, and can form a dense printed image.

BACKGROUND OF THE INVENTION

A non-aqueous ink for inkjet printing comprises an organic solvent, a binder resin, and a pigment as main components. As the binder resin, it is proposed to use resin particles having a core composed of C1-4 alkyl ester of a poly(meth)acrylic acid and a shell composed of C4-10 alkyl ester of a poly(meth) acrylic acid (Patent Document 1). The use of the resin particles achieves a higher solid content at a lower viscosity than the use of a binder resin dissolved in a solvent, improving fixing property of a pigment. However, the resin particles are not capable of dispersing a pigment. Consequently, a pigment dispersant should be used. However, the addition of a pigment dispersant to an ink causes the ink to wet a nozzle plate better, allowing more pigment particles to remain on the nozzle plate. The pigment particles stuck to the nozzle plate damage the nozzle plate when the nozzle plate is wiped in a cleaning process, resulting in degraded wiping durability. In addition, image density is lowered because less pigment particles are fixed on paper.

As a means to solve above problem, a resin particle having pigment dispersing capability is proposed, which resin particle is composed of a copolymer of C12-25 alkyl ester of poly(meth)acrylic acid with acrylic monomer having a specific group such as glycidyl group (Patent Document 2).

PRIOR ART DOCUMENTS

Patent Documents

Patent Document 1: Japanese Patent Application Laid-Open No. 2005-171032
Patent Document 2: Japanese Patent Application Laid-Open No. 2007-197500

SUMMARY OF THE INVENTION

Problems to be Solved by the Invention

To improve the ink composition comprising the aforesaid copolymer resin particles, the present inventors have made the invention of a non-aqueous pigment ink comprising copolymer resin particles having a specific content of urethane moiety (Japanese Patent Application No. 2008-294829). The present invention is to further improve the non-aqueous pigment ink in terms of wiping durability.

Means to Solve the Problems

Thus, the present invention is a non-aqueous ink composition for inkjet printing, comprising relative to a weight of the composition:

0.01 to 10 wt % of at least one ionic substance (A) selected from the group consisting of quarterly ammonium salts, quarterly phosphonium salts, a combination of a fatty acid and/or an alkyl phosphate with an amine compound, and synergists,
0.1 to 20 wt % of an $C_{12\text{-}25}$ alkyl(meth)acrylate copolymer (B) having 1 to 40 wt %, relative to a weight of the copolymer, of urethane moiety,
0.1 to 20 wt % of a pigment (C), and
an organic solvent (D).

Effects of the Invention

The combination of the ionic substance (A) with the alkyl (meth)acrylate copolymer (B) contained in the aforesaid non-aqueous ink composition of the present invention, hereinafter may be simply referred to as "ink composition", prevents the pigment from sticking to a nozzle plate, allowing more pigment to fix on paper to form dense printed images.

DETAILED DESCRIPTION OF THE PREFERRED EMBODIMENTS

<Ionic Substance (A)>

In the present ink composition, the ionic substance (A) has an ionic bond or a polar bond, and is at least one selected from the group consisting of quarterly ammonium salts, quarterly phosphonium salts, a combination of a fatty acid and/or alkyl phosphate with an amine compound, and synergists.

Cations in the quarterly ammonium salts may be ammonium ions having four $C_{1\text{-}24}$ hydrocarbon groups such as tetramethylammonium, tetraethylammonium, tetrapropylammonium, triethylmethylammonium, dodecyltrimethyl ammonium, and benzyltrimethylammonium. Anions may be hydroxyl ion, carbonate ion, carboxyl ion, halogen ions such as $Cl^-$, and $Br^-$, hydrogen sulfate ion ($HSO_4^-$), or phosphate ion.

Preferably, the quarterly ammonium salt represented by the following formula (1) is used.

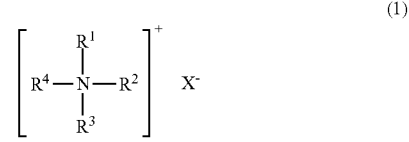

(1)

In the formula (1), two or three of $R^1$, $R^2$, $R^3$ and $R^4$ are methyl groups and the others are $C_{12\text{-}24}$ alkyl groups or $C_{6\text{-}10}$ aryl groups. Alternatively, $R^1$, $R^2$, $R^3$ and $R^4$ are all $C_{3\text{-}5}$ alkyl groups. Examples of the aryl groups include phenyl and benzyl groups. In the formula (1), X represents an acetate ion, halogen ion, or hydrogen sulfate ion.

Examples of the quarterly ammonium salt of the formula (1) include dimethyldipalmitylammonium bromide, dimethyldistearylammonium bromide, dimethyldistearylammonium chloride, tetrabutylammonium bromide, tetrabutylammonium hydrogen sulfate, stearyltrimethylammonium chloride, behenyltrmethylammonium chloride, tetradecyldimethylbenzylammonium chloride, di(hardened beef tallow alkyl) dimethylammonium acetate, wherein the alkyl group is at least one selected from $C_{14}$ alkyl, $C_{16}$ alkyl and $C_{18}$ alkyl groups, trioctylmethylammonium chloride, distearyldimethylammonium chloride, and benzyltributylammonium chloride.

Preferably, the use is made of at least one selected from the group consisting of quarterly ammonium salts with two of $R^1$, $R^2$, $R^3$ and $R^4$ being methyl groups and the other being $C_{12-24}$ alkyl or $C_{6-10}$ aryl groups such as dimethyldipalmitylammonium bromide, dimethyldistearylammonium bromide, dimethyldistearylammonium chloride, and those with $R^1$, $R^2$, $R^3$ and $R^4$ all being $C_{3-5}$ alkyl groups such as tetrabutylammonium bromide, and tetrabutylammonium hydrogen sulfate, and tetradecyldimethylbenzylammonium chloride.

As the quarterly phosphonium salt, those represented by the general formula, $[R^7{}_4P]^+X^-$, wherein $R^7$ is an alkyl or aryl group, and X is as defined above, are preferably used. Examples of the quarterly phosphonium salt include tetraalkylphosphonium halide having a $C_{1-6}$ alkyl group, such as tetramethylphosphonium chloride, tetraethylphosphonium bromide, tetrabutylphosphonium bromide; tetraarylphosphonium halide having a $C_{6-10}$ aryl group such as tetraphenylphosphoniumchloride. Among these, tetrabutylphosphonium bromide is more preferred.

The combination of a fatty acid and/or alkyl phosphate, hereinafter collectively referred to as "acid", with an amine compound is considered to be present in the present ink composition in the form of an ammonium salt or its analogue. This is speculated from the fact that the combination achieves a similar effect to the aforesaid quarterly ammonium salt and, as shown in Examples, the effect can be achieved only by the incorporation of the both acid and the amine, not by the incorporation of either the acid or the amine alone.

The fatty acids having 9 or more, preferably 12 to 30, more preferably 14 to 22, carbon atoms are used. Examples of the fatty acid include decanoic acid, isomyristyl acid, hexadecanoic acid, isopalmitic acid, oleic acid, and isostearic acid.

The alkyl phosphate may be a phosphoric acid dihydrogen alkyl ester represented by the following formula (2) or dialkyl phosphate represented by the following formula (3).

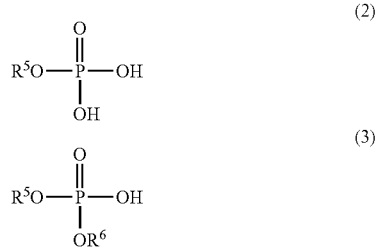

In the formulas (2) and (3), $R^5$ and $R^6$ are alkyl groups having 6 to 22, preferably 8 to 14, carbon atoms.

In the present invention, oil-soluble alkyl phosphate is preferably used. Examples of such phosphate include phosphoric acid dihydrogen isodecyl, phosphoric acid dihydrogen 2-ethylhexyl, and dibutyl phosphate.

Examples of the amine compound include aliphatic amines, cycloaliphatic amines, and aromatic amines Preferably, aliphatic amines, more preferably dialkyl amines, and trialkyl amines are used. Most preferably, the alkyl groups have 1 to 26, particularly 6 to 18, carbon atoms.

Examples of the dialkyl mines and trialkyl amines include dioctylamine, dilaurylmethylamine, trioctylamine, dimethyllaurylamine, dimethylmyristylamine, and dimethylpalmitylamine.

The fatty acid and/or alkyl phosphate and the amine compound are incorporated in such an amount that a molar equivalent ratio, [(fatty acid and/or alkyl phosphate)/amine compound], ranges from 0.1 to 10.0, preferably from 0.3 to 3, most preferably from 0.8 to 1.2. A molar equivalent ratio outside the aforesaid range may not achieve the effect of the present invention satisfactorily.

A synergist is a pigment derivative with a polar group being introduced to the pigment backbone. Examples of the pigment backbone include backbones of azo pigment, phthalocyanine pigment, quinacridone pigment, perylene pigment, isoindoline pigment, benzimidazolone pigment, piranthrone pigment, thioindigoid pigment, and quinophthalone pigment. Examples of the polar group include alkylamino group, carboxyl group, sulfonic acid group, and phthalimide group. Among these, preferred synergists are those having a backbone of a phthalocyanine pigment, particularly copper phthalocyanine blue, with a sulfonic acid group, an amino group or the like introduced thereto, such as copper phthalocyanine sulfonate (Solsperse 5000, Solsperse 12000, Solsperse 22000, all manufactured by Lubrizol Co.).

The ionic substance (A) is incorporated in an amount of 0.01 to 10 wt %, preferably from 0.05 to 0.5 wt %, of a total weight of the ink composition. When the combination of the fatty acid and/or alkyl phosphate and the amine compound is incorporated, the total content thereof ranges from 0.01 to 10 wt %, preferably from 0.1 to 3 wt %, particularly from 0.3 to 1.0 wt %. With a content of the ionic substance (A) lower than the aforesaid lower limit, satisfactory effect would not be achieved, while a content above the aforesaid upper limit might lower printed image density.

<Alkyl (meth)acrylate copolymer (B)>

The alkyl (meth)acrylate copolymer (B) has a backbone comprising repeating units of the formula (4), and an urethane side chain or crosslinking comprising repeating units of the formula (5), hereinafter referred to as "urethane moiety."

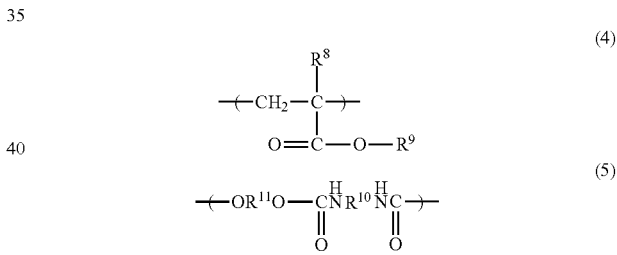

wherein $R^8$ is a hydrogen atom or a $C_{1-3}$ alkyl group, preferably methyl group, $R^9$ is a $C_{12-25}$ alkyl group, $R^{10}$ is a $C_{6-16}$ divalent hydrocarbon group, and $R^{11}$ is a $C_{2-20}$ alkylene group or oxyalkylene group.

The alkyl (meth)acrylate copolymer (B) has a long alkyl chain having 12 to 25 carbon atoms. The long alkyl group has a good affinity with the organic solvent (D). Examples of the alkyl group include dodecyl group, tridecyl group, tetradecyl group, pentadecyl group, hexadecyl group, heptadecyl group, octadecyl group, nonadecyl group, icosyl group, henicosyl group, docosyl group, isododecyl group, and isooctadecyl group, which may be branched. A plurality of these groups may be contained in the copolymer.

On the other hand, the aforesaid urethane moiety is highly polar, so that it is considered to have a good affinity with the pigment (C).

The alkyl (meth)acrylate copolymer can be prepared by the following method. In the first step, the polyalkyl (meth)acrylate backbone of the formula (4) is prepared by radically polymerizing (meth)acrylate monomer having a $C_{12-25}$ alkyl group. Because of this alkyl group, the copolymer has a good affinity with the organic solvent. Examples of the alkyl group include ethylhexyl group, dodecyl group, tridecyl group, tetradecyl group, pentadecyl group, hexadecyl group, heptadecyl group, octadecyl group, nonadecyl group, icosyl group, henicosyl group, docosyl group, isododecyl group, and isooctadecyl group, which may be branched. A plurality of these groups may be contained in the copolymer.

In the first step, an (meth)acrylate monomer having a glycidyl group is used as one of the co-monomers, which is subjected to the radical polymerization, and the resulting glycidyl group bonded to the backbone is then used for preparing a connecting moiety between the backbone and the urethane moiety of the formula (5). Examples of (meth)acrylate monomer having a glycidyl group include glycidyl (meth)acrylate, glycidyl ether of hydroxyalkyl (meth)acrylate such as 4-hydroxybutyl acrylate glycidyl ether, and 3,4-epoxycyclohexylmethyl (meth)acrylate, among which glycidyl (meth)acrylate is preferred. The (meth)acrylate monomer having a glycidyl group is contained preferably in an amount of 1 to 30% by mass, more preferably 3 to 25% by mass, and most preferably 10 to 20% by mass of a total mass of the monomers.

The use of a (meth)acrylate monomer having a β-diketone group, i.e., —C(=O)—C—C(=O)—, or β-keto ester group, i.e., —C(=O)—C—C(=O)OR, wherein R is a hydrocarbon group, as an additional co-monomer enables one to prepare an ink composition having a lower viscosity. By the use, in selecting a solvent for the ink, there will be fewer restrictions due to the viscosity of the solvent itself, thereby expanding the range of non-aqueous solvents that may be selected. Further, in those cases where fixing resins or additives are added to the ink composition as needed, a margin for increase in the ink composition viscosity caused by adding such components is expanded, resulting in a greater degree of freedom in determining the ink formulation. Moreover, β-diketone group or β-keto ester group suppresses agglomeration of pigments to suppress strike-through of printed image and to increase printed image density.

Examples of the (meth)acrylate monomer having a β-diketone group or β-keto ester group include acetoacetoxyalkyl (meth)acrylates such as acetoacetoxyethyl (meth)acrylate, hexadione (meth)acrylate, and acetoacetoxyalkyl(meth)acrylamides such as acetoacetoxyethyl (meth)acrylamide. These monomers may be used individually, or in combinations of two or more monomers.

The amount of the the (meth)acrylate monomer having a β-diketone group or β-keto ester group in the monomer mixture is preferably ranges from 3 to 30% by mass, and more preferably from 5 to 20% by mass.

Examples of other co-monomers include styrene-based monomers such as styrene and α-methylstyrene; vinyl acetate, vinyl benzoate; vinyl ether-based polymers such as butyl vinyl ether; maleic acid esters, fumaric acid esters, acrylonitrile, methacrylonitrile and α-olefins. Further, alkyl (meth)acrylates in which the ester-forming alkyl group has less than 12 carbon atoms may also be used, for example, 2-ethylhexyl (meth)acrylate, isooctyl (meth)acrylate and tert-octyl (meth)acrylate. These monomers may be used individually, or in combinations of two or more monomers.

The radical polymerization in the first step is preferably conducted in the organic solvent (D). In order to control molecular weight, the use of a chain transfer agent during polymerization is effective. Examples of the chain transfer agent include thiols such as n-butyl mercaptan, lauryl mercaptan, stearyl mercaptan and cyclohexyl mercaptan.

Examples of polymerization initiators that may be used include conventional thermal polymerization initiators, for example, azo compounds such as AIBN (azobisisobutyronitrile), and peroxides such as t-butylperoxy benzoate and t-butylperoxy-2-ethyl hexanoate (Perbutyl O, ex NOF Corporation). Alternatively, a photopolymerization initiator may be used, which generates radicals when irradiated with an active energy beam. As a polymerization solvent, petroleum-based solvents (such as aroma-free (AF) solvents) and the like can be used in a solution polymerization. This polymerization solvent is preferably one or more solvents selected from among the solvents that can be used also as the organic solvent in the ink composition, which will be listed later in the specification. During the polymerization reaction, other typically employed additives such as polymerization inhibitors, polymerization accelerators and dispersants and the like may also be added to the reaction system.

In the second step, the glycidyl group-containing polyalkyl (methl)acrylate backbone prepared in the first step is reacted with a compound having an alcoholic hydroxyl group and a group capable of reacting with glycidyl group to form a moiety to connect the urethane moiety of the formula (5) to the alkyl (meth)acrylate backbone. Examples of the compound having an alcoholic hydroxyl group and a group capable of reacting with glycidyl group include alcohols having an amino group or a carboxyl group, among which aminoalcohols are preferably used. Examples of the aminoalcohol include $C_{2-10}$ monoolamine such as monomethylethanolamine, $C_{4-20}$ diolamine such as diethanolamine, and diisopropanolamine, and a mixture thereof. Among these aminoalcohols, $C_{4-20}$ dialkanolamine particularly diethanolamine is preferred. The aminoalcohol is subjected to the reaction preferably in an amount of 0.05 to 1 mole equivalent, more preferably 0.1 to 1 mole equivalent, per mole equivalent of the aforesaid glycidyl group.

The second step can be conducted by adding the aminoalcohol and/or polyhydric alcohol to the copolymer solution obtained in the first step, and then heating, while stirring under a stream of an inactive gas.

In the third step, a polyisocyanate compound is reacted with the polyalkyl (meth)acrylate backbone having alcoholic hydroxyl group prepared in the second step, and then the urethane moiety is formed by reacting a polyhydric alcohol with isocyanate groups which remained unreacted with the alcoholic hydroxyl group. The polyhydric alcohol may be added in the second step. It is considered that the polyhydric alcohol hardly reacts with the glycidyl group, but it causes no problem even if it reacts a little. Examples of the polyhydric alcohol include polyhydric alcohol having a $C_{2-20}$ alkylene or oxyalkylene group such as ethylene glycol, propylene glycol, dipropylene glycol, 1,3-propanediol, polyethylene glycol, polypropylene glycol and a mixture of these alcohols. The polyhydric alcohol is used preferably in an amount of at most 10 moles, more preferably 1 to 5 moles per mole of the glycidyl-reactive group in the aforesaid compound having glycidyl-reactive group and alcoholic hydroxyl group.

Examples of the polyisocyanate compound used in the third step include polyisocyanate compound having a $C_{6-16}$ aliphatic group such as an alkylene group, an alicyclic group such as cycloalkylene group, or an aromatic group such as arylene group, for example, 1,6-diisocyanatohexane, 1,3-bis (isocyanatomethyl)benzene, 1,3-bis(isocyanatomethyl)cyclohexane, 1,5-naphthalene diisocyanate, and a mixture of these compounds. In order to ensure that no unreacted alcoholic hydroxyl group remain, the isocyanate compound is preferably reacted in an amount that is substantially equimolar, that is, 0.98 to 1.02 molar equivalents, with respect to the amount of alcoholic hydroxyl group.

The reaction in third step can be performed by adding the polyisocyanate compound to the copolymer solution obtained in the second step, and then heating the mixture in the presence of a catalyst such as a tin catalyst in accordance with a commonly used method.

The urethane moiety is contained in the alky (meth)acrylate copolymer (B) in an amount of from 1 to 40 wt %, preferably from 1 to 30 wt %, and more preferably from 5 to 20 wt %. The weight of the urethane moiety corresponds to a total weight of the aminoalcohol, the polyhydric alcohol, and the isocyanate compound used in the reaction.

The alkyl (meth)acrylate copolymer (B) has a weight average molecular weight determined by GPC of from 5,000 to 50,000, preferably from 8,000 to 30,000. The use of a copolymer having a lower molecular weight than the aforesaid lower limit tends to degrade storage stability of an ink composition, while the use of a copolymer having a higher molecular weight than the aforesaid higher limit tends to increase a viscosity of an ink composition, degrading ejection stability of an ink composition. It has an average particle size ($D_{50}$) measured by the dynamic light-scattering method of from 50 to 300 nm, preferably from 70 to 200 nm.

The alkyl (meth)acrylate copolymer (B) is contained in the ink composition preferably in an amount of at least 0.1 wt %, more preferably at least 2 wt % to ensure pigment dispersion. Too much alkyl (meth)acrylate copolymer (B), however, causes a viscosity of the ink composition to increase, and may degrade storage stability at a high temperature. For this reason, the content of the alkyl (meth)acrylate copolymer (B) is preferably not more than 20 wt %, more preferably not more than 15 wt %. Most preferably, the content is in the range of from 3 to 10 wt %.

<Pigment (C)>

In the present ink composition, pigment (C) is not limited to a particular one. Preferably, black pigment is used because the effect of the present invention is more prominent. Examples of the black pigment include carbon blacks such as furnace black, lamp black, acetylene black and channel black; metals or metal oxides such as copper, iron and titanium oxide; and organic pigments such as orthonitroaniline black. These pigments may be used either individually, or in combinations of two or more different pigments. Preferred pigment in terms of high printed image density is carbon black pigment having a dibutyl phthalate (DBP) oil absorption number, measured according to Japanese Industrial Standards (JIS) K6221, of from 80 $cm^3$/100 g to 140 $cm^3$/100 g and a BET specific surface area, measured by using nitrogen gas according to JIS K6217, of from 100 $m^2$/g to 200 $m^2$/g.

From the viewpoints of ejection stability and storage stability, the average particle size of the pigment is preferably not more than 300 nm, more preferably not more than 150 nm, and most preferably 100 nm or less. Here, the average particle size of the pigment may be measured using a dynamic light-scattering particle size distribution measurement apparatus, for example, LB-500 manufactured by Horiba, Ltd.

The pigment is contained in the ink composition typically in an amount of from 0.01 to 20 wt %, preferably from 1 to 15 wt %, more preferably from 5 to 10 wt %, from the viewpoints of printed image density and viscosity of the ink composition.

<Organic Solvent (D)>

The ink composition of the present invention is non-aqueous, that is, the dispersion medium of the pigment is composed of organic solvents. Examples of the organic solvent include non-polar solvents such as aliphatic hydrocarbon solvents, alicyclic hydrocarbon solvents, and aromatic hydrocarbon solvents; and polar solvents such as ester solvents, alcohol solvents, higher fatty acid solvents, and ether solvents. Examples of the aliphatic hydrocarbon solvents and alicyclic hydrocarbon solvents include Teclean N-16, Teclean N-20, Teclean N-22, Nisseki Naphtesol L, Nisseki Naphtesol M, Nisseki Naphtesol H, No. 0 Solvent L, No. 0 Solvent M, No. 0 Solvent H, Nisseki Isosol 300, Nisseki Isosol 400, AF-4, AF-5, AF-6 and AF-7, all manufactured by JX Nippon Oil & Energy Corpration, and Isopar G, Isopar H, Isopar L, Isopar M, Exxsol D40, Exxsol D80, Exxsol D100, Exxsol D130 and Exxsol D140, all manufactured by Exxon Mobil Corporation. Examples of the aromatic hydrocarbon solvents include Nisseki Cleansol G (alkylbenzene) manufactured by JX Nippon Oil & Energy Corpration, and Solvesso 200 manufactured by Exxon Mobil Corporation.

Examples of the ester solvents include methyl laurate, isopropyl laurate, hexyl laurate, isopropyl myristate, isopropyl palmitate, isooctyl palmitate, methyl oleate, ethyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, diisopropyl adipate, diisopropyl sebacate, diethyl sebacate, propylene glycol monocaprate, trimethylolpropane tri-2-ethylhexanoate and glyceryl tri-2-ethylhexanoate. Examples of the alcohol solvent include isomyristyl alcohol, isopalmityl alcohol, isostearyl alcohol and oleyl alcohol. Examples of the higher fatty acid solvents include isononanoic acid, isomyristic acid, hexadecanoic acid, isopalmitic acid, oleic acid and isostearic acid. Examples of the ether solvents include diethylene glycol monobutyl ether, ethylene glycol monobutyl ether, propylene glycol monobutyl ether and propylene glycol dibutyl ether. A mixture of two or more of these solvents can be used. Preferably, the ester solvents, particularly isooctyl parmitate, and hexyl laurate, are used.

<Optional Components>

The ink composition of the present invention can contain an optional component in such an amount that it does not impair the effects the present invention. For example, a resin may be added besides the aforesaid component (B). Examples of the resin include acrylic resins, styrene-acrylic resins, styrene-maleic acid resins, rosin-based resins, rosin ester-based resins, ethylene-vinyl acetate resins, petroleum resins, coumarone-indene resins, terpene phenol resins, phenolic resins, urethane resins, melamine resins, urea resins, epoxy resins, cellulose-based resins, vinyl chloride acetate resins, xylene resins, alkyd resins, aliphatic hydrocarbon resins, butyral resins, maleic acid resins, fumaric acid resins, hydroxyl group-containing carboxylate esters, salts of long-chain polyaminoamides and high-molecular weight acid esters, salts of high-molecular weight polycarboxylic acids, salts of long-chain polyaminoamides and polar acid esters, high-molecular weight unsaturated acid esters, high-molecular weight copolymers, modified polyurethanes, modified polyacrylates, polyether ester anionic surfactants, naphthalenesulfonic acid-formalin condensate salts, aromatic sulfonic acid-formalin condensate salts, polyoxyethylene alkyl phosphate esters, polyoxyethylene nonylphenyl ethers, polyester polyamines, and stearyl amine acetate.

Other additives such as nozzle blockage prevention agents, antioxidants, conductivity modifiers, viscosity modifiers, surface tension modifiers and oxygen absorbers and the like may also be added. Such additive is not limited to a particular one, and any additive commonly used in this technical area can be used.

The ink composition of the present invention can be prepared by placing the component (A), a mixture of the component (B) and the component (D), the component (C), an additional amount of the component (D) to adjust the viscosity of the ink composition, if needed, and an optional component as desired in a lump or in several parts in a disperser such as a bead mill, and stirring to mix them followed by filtering the mixture with a filter such as a membrane filter as desired.

The viscosity of the ink, though the suitable range thereof varies depending on several factors such as the diameter of ejecting head nozzles and ejecting environment, is preferably in the range of from 5 to 30 mPa·s, more preferably from 5 to 15 mPa·s, and most preferably about 10 mPa·s at 23° C. Here, the values of the viscosity are those measured at 23° C. by raising the shear stress from 0 Pa to 10 Pa at a rate of 0.1 Pa/s.

An inkjet printer used with the present ink composition may employ any of various printing systems, including a piezo system, electrostatic system or thermal system. In those cases where an inkjet recording apparatus is used, it is preferred to eject the ink according to the present invention from an inkjet head controlled with a digital signal, and make the ejected ink droplets adhered to a recording medium.

EXAMPLES

<Preparation of alkyl(meth)acrylate copolymer (B)>
(1) Urethane-containing (meth)acrylate copolymer A 300 ml four-neck flask was charged with 75 g of AF-7 (a naphthene type solvent, ex JX Nippon Oil & Energy Corporation), and the temperature was raised to 110° C. while stirring under a stream of nitrogen gas. Subsequently, with the temperature maintained at 110° C., a mixture of the monomers as shown in the Table 1 was placed in the four-neck flask, and a mixture of 16.7 g of AF-7, and 4 g of Perbutyl O (t-butylperoxy-2-ethylhexanoate, ex NOF Corporation) was added dropwise to the flask over a period of 3 hours. Then, with the temperature maintained at 110° C., 0.2 g of Perbutyl O was added after an additional one hour and two hours respectively. The reaction mixture was aged for additional one hour, and then diluted with 12.7 g of AF-7, whereby a colorless and transparent solution of a copolymer, hereinafter referred to as the comparative methacrylate copolymer, with a non-volatile content of 50% was obtained.

TABLE 1

| Monomer | g |
|---|---|
| Behenyl methacrylate | 50 |
| Dodecyl methacrylate | 15 |
| Glycidyl methacrylate | 15 |
| Acetoacetoxyethyl methacrylate | 20 |
| Total | 100 |

A 500 ml four-neck flask was charged with 200 g of the above copolymer solution obtained (a solid content of 100 g), 111 g of isooctyl palmitate (IOP, ex Nikko Chemicals Co., Ltd.), 4.0 g of propylene glycol, and 2.8 g of diethanolamine, and the temperature was raised to 110° C. while stirring under a stream of nitrogen gas. After maintaining the temperature at 110° C. for one hour, 0.2 g of dibutyltin dilaurate was added, and a mixture of 7.3 g of Takenate 600 (1,3-bis(isocyanate methyl) cyclohexane, ex Mitsui Polyurethane Co.) and 65.7 g of IOP was added dropwise to the flask over a period of one hour. Following the completion of the addition, the temperature was raised to 120° C. at which temperature the reaction was allowed to proceed for 6 hours. Subsequently, the reaction mixture was cooled, and 70 g of AF-7 (a naphthene type solvent, ex JX Nippon Oil & Energy Corporation) was added to the reaction mixture, whereby a dispersion of a urethane-modified methacrylate copolymer, herein after referred to as "polymer a", with a solid content of 25% was obtained. The urethane moiety of the polymer a thus obtained accounted for about 12 wt % of the copolymer. The polymer a had a weight average molecular weight of 20, 200 determined by GPC method using polystyrene standards. The average particle size, $D_{50}$, of the polymer a in the dispersion was 188 nm, which was measured by a dynamic light-scattering particle size distribution measurement apparatus, LB-500 manufactured by Horiba, Ltd.

Polymers b to d, and the comparative polymer f having no long alkyl group, hereinafter referred to as "C8 methacrylate copolymer", were prepared in the similar manner as in the preparation of the polymer a except that the monomers shown in the following Table 2, and a polymerization initiator, Perbutyl O, were used.

TABLE 2

| Monomer (g) | Polymer b | Polymer c | Polymer d | Polymer e | Polymer f |
|---|---|---|---|---|---|
| Behenyl methacrylate | 50 | 50 | 50 | 50 | 0 |
| 2-ethylhexyl methacrylate | 0 | 0 | 0 | 0 | 85 |
| Dodecyl methacrylate | 25 | 15 | 15 | 15 | 0 |
| 2-Acetoacetoxyethyl methacrylate | 20 | 20 | 20 | 20 | 0 |
| Glycidyl methacrylate | 5 | 15 | 15 | 15 | 15 |
| Perbutyl O | 4 | 3 | 2 | 6 | 4 |
| Weight average molecular weight | 19700 | 24700 | 38900 | 7200 | 21200 |

Examples 1 to 9, Comparative Examples 1 to 9

Each ink composition was prepared by placing in a glass container the components according to the formulation (wt %) shown in Tables 3 and 4, and 80 g of zirconia beads (diameter: 0.5 mm), and then shaking the container using a rocking mill (Model RM05S, ex Seiwa Technical Lab Co., Ltd.) at 60 Hz for 2 hours. Details of the components indicated in Tables 3 and 4 are as follows:

MA-100: Carbon black having a DBP absorption number of 100 $cm^3/100$ g and a specific surface area of 110 $m^2/g$ measured by nitrogen adsorption, ex Mitsubishi Chemical Co.

MA-11: Carbon black having a DBP absorption number of 64 $cm^3/100$ g and a specific surface area by nitrogen adsorption of 92 $m^2/g$, ex Mitsubishi Chemical Co.

Solsperse 28000: Polymer dispersant, ex Lubrizol Japan Ltd.
Solsperse 5000: Synergist, ex Lubrizol Japan Ltd.
AF-7: Naphthene type solvent, ex JX Nippon Oil & Energy Corporation The ink compositions thus obtained were evaluated according to the following methods. Results are shown in Tables 3 and 4, in which "Ex." stands for "Example", and "Comp.Ex." stands for "Comparative Example".
(1) Printed Image Density Each of the ink compositions was loaded into an inkjet printer HC5500, ex Riso Kagaku Corporation, and a solid image was printed on Riso lightweight paper, ex Riso Kagaku Corporation. The optical density (OD) values of the surface and the rear surface of the solid image were measured using an optical densitometer (RD920, ex Macbeth Corporation), and were rated according to the criteria below. A higher surface OD value indicates higher image density, and a lower rear surface OD value indicates less strike-through, both of which are desirable.

Printed image density (surface OD)
A: 1.10 or higher, B: 1.05 to 1.09, C: 1.04 or lower
Printed image density (rear surface OD)
A: 0.25 or lower, B: 0.26 to 0.30, C: 0.31 or higher (2) Ink Ejection Stability One hundred copies of a solid image with dimensions of 51 mm in the main scanning direction, corresponding to 600 nozzle widths, by 260 mm in the sub-scanning direction were printed in a continuous manner. The ink ejection stability was evaluated by counting the number of white bands, which are unprinted portions caused by failure in ink ejection, in the 100 printed images (corresponding to a total of 60,000 nozzles), according to the criteria shown below.

A: No ejection failure, B: less than 5 white bands, C: 5 or more white bands (3) Evaluation of Wiping Durability After the above test for ink ejection stability, the head was repeatedly cleaned predetermined times according to a normal cleaning mode of head maintenance. A portion of the head that had been brought in contact with the wiping blade was visually observed for any degradation in ink repellency, and rated according to the following criteria.

A: Ink was repelled immediately after the head cleaning in all the portions brought in contact with the wiping blade.

B: Ink was repelled in 20 seconds after the head cleaning in all the portions brought in contact with the wiping blade.

C: Ink was stuck to some portions brought in contact with the wiping blade.

D: Ink was stuck to all the portions brought in contact with the wiping blade.

(4) Ink Storage Stability (70° C.)

Each of the inks was placed in a sealed container and left standing for 4 weeks at 70° C. Then, the changes in the viscosity and particle size of the ink were determined, which were rated in the manner described below. The particle size was measured by a dynamic light-scattering particle size distribution measurement apparatus, LB-500 manufactured by Horiba, Ltd.

Viscosity/Particle Size Change:

[(Viscosity or particle size after 4 weeks×100)/(Initial viscosity or particle size)]−100 (%)

Inks for which the changes in the viscosity and the particle size were both less than 5% were rated as A, inks for which at least one of the changes in the viscosity and the particle size was at least 5% but less than 10% were rates as B, and inks for which at least one of the changes in the viscosity and the particle size was 10% or greater were rated as C.

TABLE 3

| | (content/g) | Ex. 1 | Ex. 2 | Ex. 3 | Ex. 4 | Ex. 5 | Ex. 6 | Comp Ex. 1 | Comp Ex. 2 | Comp Ex. 3 | Comp Ex. 4 | Comp Ex. 5 | Comp Ex. 6 |
|---|---|---|---|---|---|---|---|---|---|---|---|---|---|
| (C) Pigment | MA-100 | 10.00 | 10.00 | 10.00 | 10.00 | 10.00 | | 10.00 | 10.00 | 10.00 | 10.00 | 10.00 | 10.00 |
| | MA-11 | | | | | | 10.00 | | | | | | |
| (B) Alkyl(meth)acrylate copolymer | Polymer a | 20.00 | 20.00 | 20.00 | 20.00 | | 20.00 | 20.00 | | | 20.00 | 20.00 | 20.00 |
| | Polymer b | | | | | 20.00 | | | | | | | |
| Comparative methacrylate copolymer | | | | | | | | | 12.50 | | | | |
| Commercial dispersant | Solsperse 28000 | | | | | | | | | 5.00 | | | |
| (D) Organic solvent | AF-7 | 31.00 | 31.00 | 34.77 | 34.77 | 31.00 | 31.00 | 31.10 | 31.00 | 39.95 | 34.60 | 34.60 | 34.60 |
| | Isooctyl palmitate | 33.90 | 33.90 | 29.48 | 29.48 | 33.90 | 33.90 | 33.90 | 41.40 | 39.95 | 29.62 | 29.61 | 29.68 |
| | Isomyristyl alcohol | 5.00 | 5.00 | 5.40 | 5.40 | 5.00 | 5.00 | 5.00 | 5.00 | 5.00 | 5.40 | 5.40 | 5.40 |
| (A) Ionic substance | Tetrabutylammonium bromide | 0.10 | | | | 0.10 | 0.10 | | 0.10 | 0.10 | | | |
| | Tetrabutylphosphonium bromide | | 0.10 | | | | | | | | | | |
| | Oleic acid | | | 0.19 | | | | | | | 0.38 | | |
| | Phosphoric acid dihydrogen isodecyl | | | | 0.20 | | | | | | | 0.39 | |
| | Dioctylamine | | | 0.16 | 0.15 | | | | | | | | 0.32 |
| Rating | Printed image density (surface OD) | A | A | A | A | A | B | A | B | C | A | A | A |
| | Printed image density (rear surface OD) | A | A | A | A | A | B | A | C | C | A | A | A |
| | Wiping durability | A | A | A | A | B | A | C | A | A | C | C | C |
| | Storage stability | A | A | A | A | A | A | A | C | A | A | B | C |
| | Ejection stability | A | A | A | A | A | A | A | C | A | A | C | C |

TABLE 4

| | (content/g) | Ex. 7 | EX. 8 | EX. 9 | Comp. Ex. 7 | Comp. Ex. 8 | Comp. Ex. 9 |
|---|---|---|---|---|---|---|---|
| (C) Pigment | MA-100 | 10.00 | 10.00 | 10.00 | 10.00 | 10.00 | 10.00 |
| (B) Alkyl(meth)acrylate copolymer | Polymer c | 20.00 | | | | | 20.00 |
| | Polymer d | | 20.00 | | | | |
| | Polymer e | | | 20.00 | | | |
| C8 methacrylate copolymer | Polymer f | | | | 20.00 | | |
| Commercial dispersant | Solsperse 28000 | | | | | 5.00 | |
| (D) Organic solvent | AF-7 | 32.10 | 32.10 | 32.10 | 32.10 | 39.60 | 32.30 |
| | Isooctyl palmitate | 32.10 | 32.10 | 32.10 | 32.10 | 39.60 | 32.30 |
| | Isomyristyl alcohol | 5.40 | 5.40 | 5.40 | 5.40 | 5.40 | 5.40 |
| (A) Ionic substance | Solsperse 5000 | 0.40 | 0.40 | 0.40 | 0.40 | 0.40 | |
| Ink viscosity (mPa · s) | | 10.2 | 13.2 | 9.7 | 17.2 | 9.7 | 9.9 |
| Rating | Printed image density (surface OD) | A | A | A | B | C | A |
| | Printed image density (rear surface OD) | A | A | A | A | C | A |

TABLE 4-continued

| (content/g) | Ex. 7 | EX. 8 | EX. 9 | Comp. Ex. 7 | Comp. Ex. 8 | Comp. Ex. 9 |
|---|---|---|---|---|---|---|
| Wiping durability | A | A | A | A | A | C |
| Storage stability | A | A | B | C | A | A |
| Ejection stability | A | B | A | C | A | A |

As shown in Tables 3 and 4, comparative examples 1 and 9 both lacking the ionic substance (A), and comparative examples 4-6 all lacking the amino compound or the acid showed poor wiping durability due to pigments stuck on the nozzles. Comparative 2 comprising the comparative methacrylate copolymer having no urethane moiety, and comparative example 7 comprising the C8 methacrylate copolymer having no long alkyl group showed the strike-through, and also showed poor storage stability and ejection stability. Comparative examples 3 and 8 comprising a generally used polymer dispersant in place of the copolymer (B) showed lower printed image density.

On the other hand, all of the examples comprising the ink composition of the present invention showed excellent results, while the printed image density of example 6, the ink ejection stability of example 8 comprising the copolymer (B) having a weight average molecular weight of about 40,000, and the storage stability of example 9 comprising the copolymer (B) having a weight average molecular weight of about 7,000, were a little inferior to other examples.

INDUSTRIAL APPLICABILITY

The non-aqueous ink composition of the present invention hardly sticks to a nozzle plate, so it improves wiping durability of the nozzle plate and forms dense printed images for a long period of time.

The invention claimed is:

1. A non-aqueous ink composition for inkjet printing, comprising relative to a weight of the composition:

0.01 to 10 wt % of at least one ionic substance (A) selected from the group consisting of quaternary ammonium salts, quaternary phosphonium salts, a combination of a fatty acid and/or an alkyl phosphate with an amine compound, and synergists, 0.1 to 20 wt % of an $C_{12-25}$ alkyl(meth)acrylate copolymer (B) having 1 to 40 wt %, relative to a weight of the copolymer, of urethane moiety, 0.1 to 20 wt % of a pigment (C), and an organic solvent(D).

2. The non-aqueous ink composition according to claim 1, wherein the ionic substance (A) is a quaternary ammonium salt represented by the following formula (1):

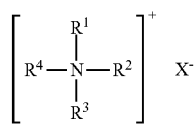

where in the formula (1) two or three of $R^1$, $R^2$, $R^3$ and $R^4$ are methyl groups and the others are $C_{12-24}$ alkyl groups or $C_{6-10}$ aryl groups, or $R^1$, $R^2$, $R^3$ and $R^4$ are all $C_{3-5}$ alkyl groups.

3. The non-aqueous ink composition according to claim 1, wherein the ionic substance (A) is selected from the group consisting of tetraalkylphosphonium halide having a $C_{1-6}$ alkyl group and tetraarylphosphonium halide having a $C_{6-10}$ aryl group.

4. The non-aqueous ink composition according to claim 1, wherein the ionic substance (A) is a combination of a fatty acid having 14 to 22 carbon atoms and/or a monoalkyl phosphate having 6 to 22 carbon atoms with an aliphatic amine having 4 to 26 carbon atoms.

5. The non-aqueous ink composition according to claim 1, wherein the ionic substance (A) is a synergist comprising copper phthalocyanine sulfonate.

6. The non-aqueous ink composition according to claim 1, wherein the alkyl (meth) acrylate copolymer (B) has a backbone comprising repeating units of the formula (4), and an urethane side chain or crosslinking comprising repeating units of the formula (5):

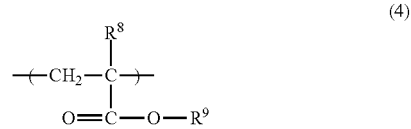

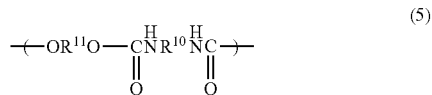

wherein $R^8$ is a hydrogen atom or a $C_1$ alkyl group, $R^9$ is a $C_{12-25}$ alkyl group, $R^{10}$ is a $C_{6-16}$ divalent hydrocarbon group, and $R^{11}$ is a $C_{2-20}$ alkylene group or oxyalkylene group.

7. The non-aqueous ink composition according to claim 1, wherein the alkyl (meth) acrylate copolymer (B) has a weight average molecular weight of from 8,000 to 30,000.

8. The non-aqueous ink composition according to claim 1, wherein the alkyl (meth) acrylate copolymer (B) further comprises a β-diketone group or β-keto ester group.

9. The non-aqueous ink composition according to claim 1, wherein the pigment (C) comprises carbon black having a DBP oil absorption number of from 80 $cm^3$/100 g to 140 $cm^3$/100 g, and a BET specific surface area, measured by using nitrogen gas, of from 100 $m^2$/g to 200 $m^2$/g.

* * * * *